United States Patent [19]

Nelson et al.

[11] Patent Number: 4,728,348

[45] Date of Patent: Mar. 1, 1988

[54] LOW STRESS CYCLONE GAS COLLECTION SYSTEMS

[75] Inventors: Norman W. Nelson, Chester; Wilbur H. Hild, Jr., Boonton; Donald F. Shaw, Denville, all of N.J.

[73] Assignee: Exxon Research and Engineering Company, Florham Park, N.J.

[21] Appl. No.: 897,720

[22] Filed: Aug. 18, 1986

[51] Int. Cl.$^4$ .......................................... B01D 45/12
[52] U.S. Cl. ................................. 55/345; 55/349; 55/459.1; 422/144; 422/147; 422/241
[58] Field of Search ............... 55/345, 349, 459 R; 422/144, 147, 241

[56] References Cited

U.S. PATENT DOCUMENTS

| | | | |
|---|---|---|---|
| 3,333,402 | 8/1967 | Kalen | 55/345 |
| 3,951,629 | 4/1976 | Kalen | 55/349 |
| 4,101,288 | 7/1978 | Smith et al. | 422/144 |
| 4,273,565 | 6/1981 | Worley | 55/345 X |
| 4,287,158 | 9/1981 | Roots | 422/241 |
| 4,547,341 | 11/1985 | Weber | 422/147 |

OTHER PUBLICATIONS

Oil and Gas Journal, Apr. 29, 1985, pp. 71–79.

*Primary Examiner*—Charles Hart
*Attorney, Agent, or Firm*—Joseph J. Dvorak

[57] ABSTRACT

The present invention comprises suspending vessel internal components such as cyclones from a vessel roof by support hangers having a predetermined length and thermal coefficient of expansion such that the thermal expansion of support hangers of different lengths is such that the elevation of suspended components relative to each other under variable thermal conditions is substantially constant.

10 Claims, 5 Drawing Figures

LOW STRESS CYCLONE GAS COLLECTION SYSTEMS

FIELD OF THE INVENTION

The present invention relates to improvements in supporting structures to be housed within high temperature vessels. Indeed, the present invention is especially directed toward improvements in supporting cyclone separators in vessels employed in fluid solids processes such as catalyst regenerator vessels and the like.

BACKGROUND OF THE INVENTION

There are a number of commercially known fluid solid processes which are conducted at high temperatures and which require removal of particulates from effluent gas streams. A representative example of such processes is the fluidized catalytic cracking of petroleum feedstocks. Fluidized catalytic cracking units employ both a reactor vessel and a catalyst regenerator vessel, each of which includes cyclones for the recovery of catalyst particulates from the gases emanating from these vessels.

Those particulate recovery systems in which a solids entrained gas stream passes first to a cyclone separator for removal of particulates and thence to a manifold for exiting the vessel are called single stage cyclone systems. Since single stage cyclone systems are not sufficiently efficient to meet todays particulate recovery requirements, it is known to couple the outlet of a first stage or primary cyclone separator to the inlet of a second or secondary cyclone separator thereby providing a two stage particulate recovery system of high efficiency. Catalyst regenerator vessels in fluid cat cracking units is one such example of a two stage particulate recovery system.

Because of the geometrical constraints imposed upon the location of the cyclones within the vessels having two stage particulate systems, the thermal stresses between the cyclones and reactor internals resulting from the higher temperature conditions existing within the vessel during operation tend to be exaggerated. Hence, stress compensating techniques are required for suspending the cyclones to avoid downtime for maintenance and correction of mechanical failures. A number of stress compensating cyclone suspension techniques are disclosed, for example, in the *Oil and Gas Journal,* Apr. 29, 1985, pages 71 to 79; U.S. Pat. No. 4,287,158, U.S. Pat. No. 3,951,629 and U.S. Pat. No. 3,333,402.

Notwithstanding the numerous techniques used to suspend cyclones in vessels, there still remains a need for improved techniques for suspending such cyclones which will maximize the use of ordinary shop fabricated parts that can easily be lowered in the vessel thereby eliminating the need for field welding, on site fabrication, and the like.

SUMMARY OF THE INVENTION

Very simply, in accordance with the present invention, a plurality of cyclones are suspended from the roof of a vessel by means of rod like support hangers. Because of the location of the cyclones within the vessel at least some cyclones will have support hangers of different lengths than support hangers for other cyclones. Importantly, however, all supports have thermal expansion or thermal growth characteristics whereby differential thermal expansion is minimized.

Broadly stated, then the present invention comprises suspending vessel internal components such as cyclones from a vessel roof by support hangers having a predetermined length and thermal coefficient of expansion such that the thermal expansion of support hangers of different lengths is such that the elevation of suspended components relative to each other under variable thermal conditions is substantially constant.

Thus, in one embodiment of the present invention, there is provided a reaction vessel having a non-horizontal roof. A plurality of primary cyclones is disposed within the vessel below the roof, preferably in an outer annular ring. A plurality of secondary cyclones also is disposed within the vessel below the roof in substantially an inner concentric annular ring. The gas outlet of each primary cyclone is operably connected to a gas inlet of a secondary cyclone, there being an equal number of primary and secondary cyclones. The gas outlet of each of the secondary cyclones is operably connected to a gas plenum chamber. Each of the primary and secondary cyclones is suspended from the non-horizontal roof of the reaction vessel by means of a pair of rod like hangers. The length of the hangers for the secondary cyclones is greater than the length of the hangers employed for the primary cyclones. Importantly, however, the thermally induced expansion or contraction of the hangers employed for the primary cyclones is such that the elevation of operably interconnected cyclones relative to each other is substantially constant.

The design of the present invention maximizes the use of ordinary shop fabricated pipes. Additionally, the design of the present invention minimizes the amount of field welding necessary during installation of cyclones in a vessel. Moreover, the design of the present invention operates to provide a cost effective load transfer mechanism for the suspended structures thereby avoiding the problems of high load induced bending stresses normally observed in such vessels.

These and other features of the present invention wil be better understood upon a reading of the detailed description in light of the accompanying drawings.

DETAILED DESCRIPTION OF THE INVENTION

In the description which follows, like numerals are used to indicate like elements. Also in the detailed description which follows, reference will be made to a two-stage cyclone collection system. However, it should be readily apparent that the principles described herein are equally applicable to three-stage cyclone systems.

Figure 4:
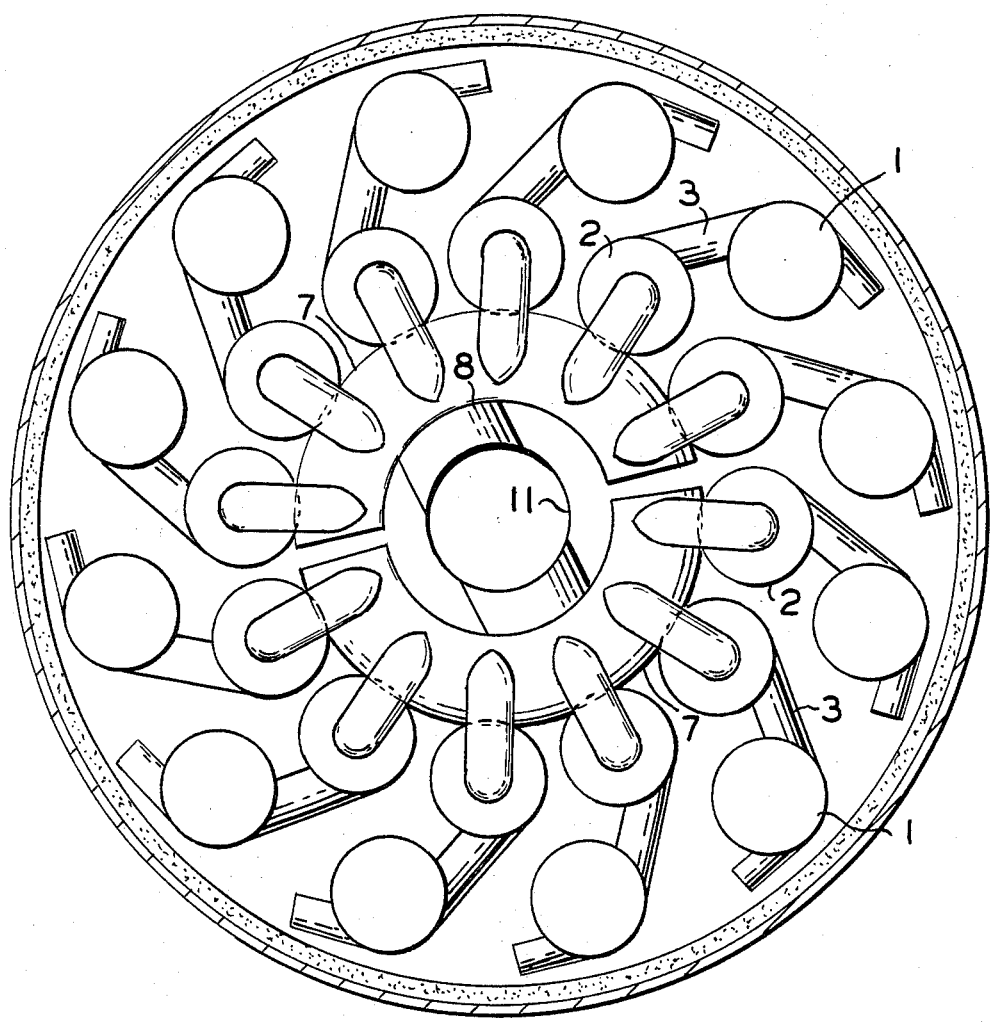
FIG. 4 is a top plan schematic diagram showing the arrangement of cyclones in the vessel of FIGS. 1 to 4.
Figure 5:
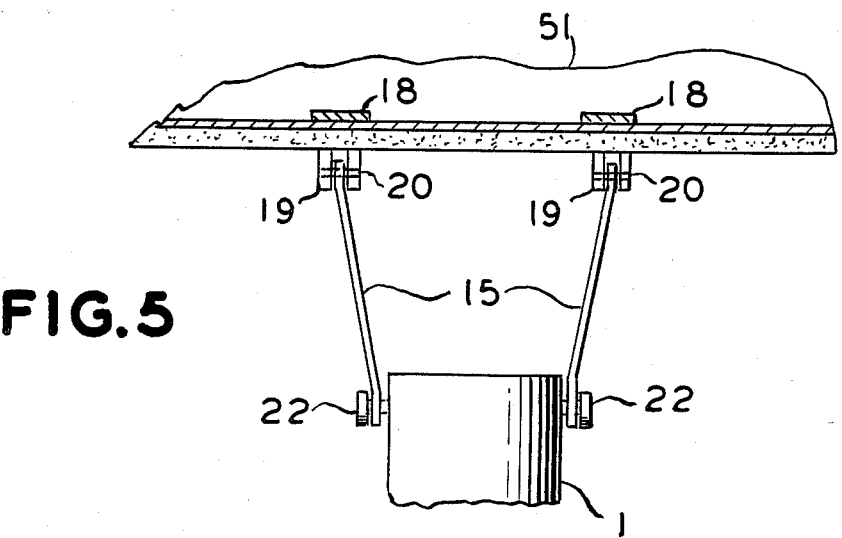
FIG. 5 is a partial vertical section taken along line 5—5 of FIG. 1 and showing canting of support hangers.

Now turning to the figures, the vessel 50 is generally cylindrical in shape having a vertical side wall 52 and a sloped roof 51. The inner surface of vessel 50 is provided with refractory insulating material 16. A plurality of primary cyclones 1 are located within the vessel below the roof 51 and arranged as shown in FIG. 5 in generally an annular ring. Also located within reactor 50 below roof 51 is a plurality of secondary cyclones 2 located as shown in FIG. 4 in an inner concentric annular ring. In the reactor vessel, there are an equal number of primary and secondary cyclones. The outlet from a primary cyclone 1 is operably connected to the gas inlet of an adjoining secondary cyclone 2 via gas duct 3. The outlet of each of the secondary cyclones 2 is operably connected to the gas collecting ring 7 via elbow 10. Pipe 8 serves to connect the collecting ring 7 with riser 11. Thus, flow through the unit is as follows: particulate laden gas flows into the primary cyclone 1. The gas exiting the primary cyclone 1 passes through a connecting duct 3 into secondary cyclone 2. Gas leaving the secondary cyclone will pass through elbow 10 into collecting ring 7 and thence through pipe 8 into riser 11.

Returning to the mechanical design of the vessel, the primary and secondary cyclones are suspended from roof 51 by means of rod like hangers 15 and 4, respectively. Indeed, a pair of hangers are employed for each cyclone. The rods 4 and 15 are suspended from the roof 51 of the reactor vessel 50 by means of a mounting member having a reinforcing plate 18, a web portion 19 and cylindrical rod or pin 20 which extends through a corresponding opening in rods 4 or 15 as the case may be. Other techniques, of course, may be employed in securing the rods 4 and 15 to the roof 51 of the reactor vessel 50. However, it is particularly preferred to pivotally mount the support rods 4 or 15 from the roof by means of a pivotal mounting member such as that just described.

As is shown in the figures, the primary secondary cyclones also are provided with a rod 22 which extends through a corresponding opening in the opposite end of rods 4 and 15 so as to pivotally mount the cyclones therefrom. Other techniques such as bolts and the like may be used to secure the cyclones to the support rods; however, it is especially preferred that the rods be secured to the cyclones by pivotal attachment means.

In the practice of the present invention, it is important that the thermally induced expansion or contraction of the support rods 4 for the secondary cyclones 2 is substantially equal to the thermally induced expansion or contraction of the support rods 15 employed for the primary cyclones 1 such that the elevation of the connected cyclones relative to each other is substantially constant. In other words, the support rods 4 and 15 have different but predetermined lengths and thermal coefficients of expansion sufficient to minimize differential thermal movement of operably connected cyclones as measured from the centerline of connecting gas duct 3. In the FIG. 1 embodiment of the present invention this is achieved by use of a material for fabricating support rods 4 which has a lower thermal coefficient of expansion than that of support rods 15 and by using rods of predetermined lengths so that the differential thermal movement at the centerline of ducts operably connecting cyclones is minimized so that the thermal growth of all the support rods is substantially equal. Thus for example, rods 4 may be made of an iron based, oxide dispersed, ferritic, nickel steel alloy, whereas rods 15 may be made of 18-8 stainless steel. The length of rods 4 is such that the support pins 22 of rods 4 in the FIG. 1 embodiment are located, at an elevation, e, measured from the support head of rod 15. This dimension e can be calculated as shown below, based on the following assumptions:

(1) The exterior shell of the reactor vessel 50 is fabricated from carbon steel and operates at a uniform temperature, Tcs above a reference ambient temperature Ta.

(2) The interior metal components such as the support rods operate at a higher uniform temperature, Tin above a reference ambient temperature Ta.

(3) The interior metal components except for rods 4 are fabricated from 18-8 stainless steel.

(4) Support rods 4 are fabricated from ferritic nickel steel.

(5) The top of flange 13 of reactor vessel 50 is used as a reference for vertical thermal expansion.

The thermally induced vertical expansion, $-\Delta s$, of support rods 4 of the secondary cyclones as measured from point s to the centerline of the connecting duct 3 is given by Equation 1.

$$-\Delta s = \alpha cs(Tcs-Ta)C + \alpha ns(Tin-Ta)(d+e) + \alpha ss(-Tin-Ta)f \qquad \text{Eq. 1}$$

The thermally induced vertical expansion, $-\Delta p$, for the primary cyclone as measured from point t to the centerline of the connect duct 3 is given by Equation 2.

$$-\Delta p = \alpha cs(Tcs-Ta)(c+d) + \alpha ns(Tss-Ta)(e+f) \qquad \text{Eq. 2}$$

Equating $-\Delta p$ and $-\Delta s$ and solving for e gives Equation 3.

$$e = d[\alpha ns(Tin-Ta) - \alpha cs(Tcs-Ta]/[(\alpha ss - \alpha nx)(Tin-Ta)] \qquad \text{Eq. 3}$$

Then there will be substantially no differential thermal expansion between the primary and secondary cyclones if e is determined by the Equation 3 where d=elevation difference in cyclone support points on head;

e=elevation of support pin 22 for rods 4 as measured from the support head of rods 15;

$\alpha$ns=linear coefficient of thermal expansion of nickel steel;

$\alpha$ss=linear coefficient of thermal expansion of 18-8 stainless steel;

Tcs=temperature of insulated head above zero stress reference temperature;

Tin=internal design temperature above zero stress referenced temperature;

Ta=a reference ambient temperature.

Figure 2:
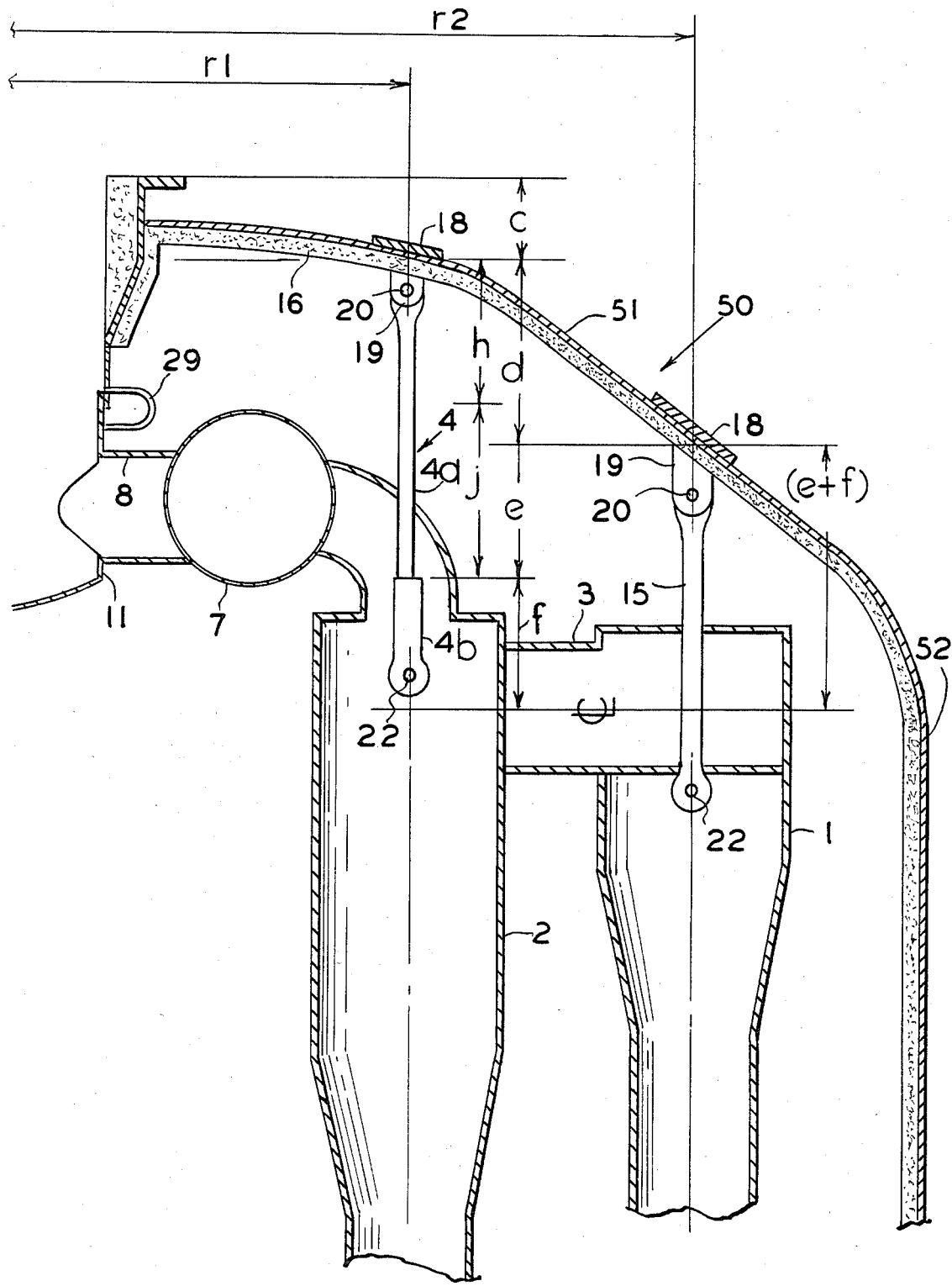
FIGS. 2 and 3 are views similar to FIG. 1, each showing an alternate embodiment of the present invention.

If the dimension e is such that the support point 22 of rods 4 is higher than what would be desired for other reasons, then rods 4 may be constructed as shown in FIG. 2 in two sections an upper section 4a and a lower section 4b. Each section, 4a and 4b, is made from a different alloy to provide the requisite balancing of thermal growth of rods 4 and 15. In this instance the dimension e refers only to that part of rod 4, i.e., section 4a, having a different coefficient of thermal expansion from the material of rods 15. Thus, for example, portion 4a may be a ferritic nickel alloy whereas 4b and rods 15 may be stainless steel.

From the foregoing it should be noted that although the design concept disclosed thus far will eliminate differential thermal stresses between primary and secondary cyclones, there will be differential movements between riser 11 and connecting pipes 8 unless special measures are taken. One measure to compensate for that differential expansion is to use an expansion joint 29 as shown in FIGS. 1 and 2.

Figure 1:
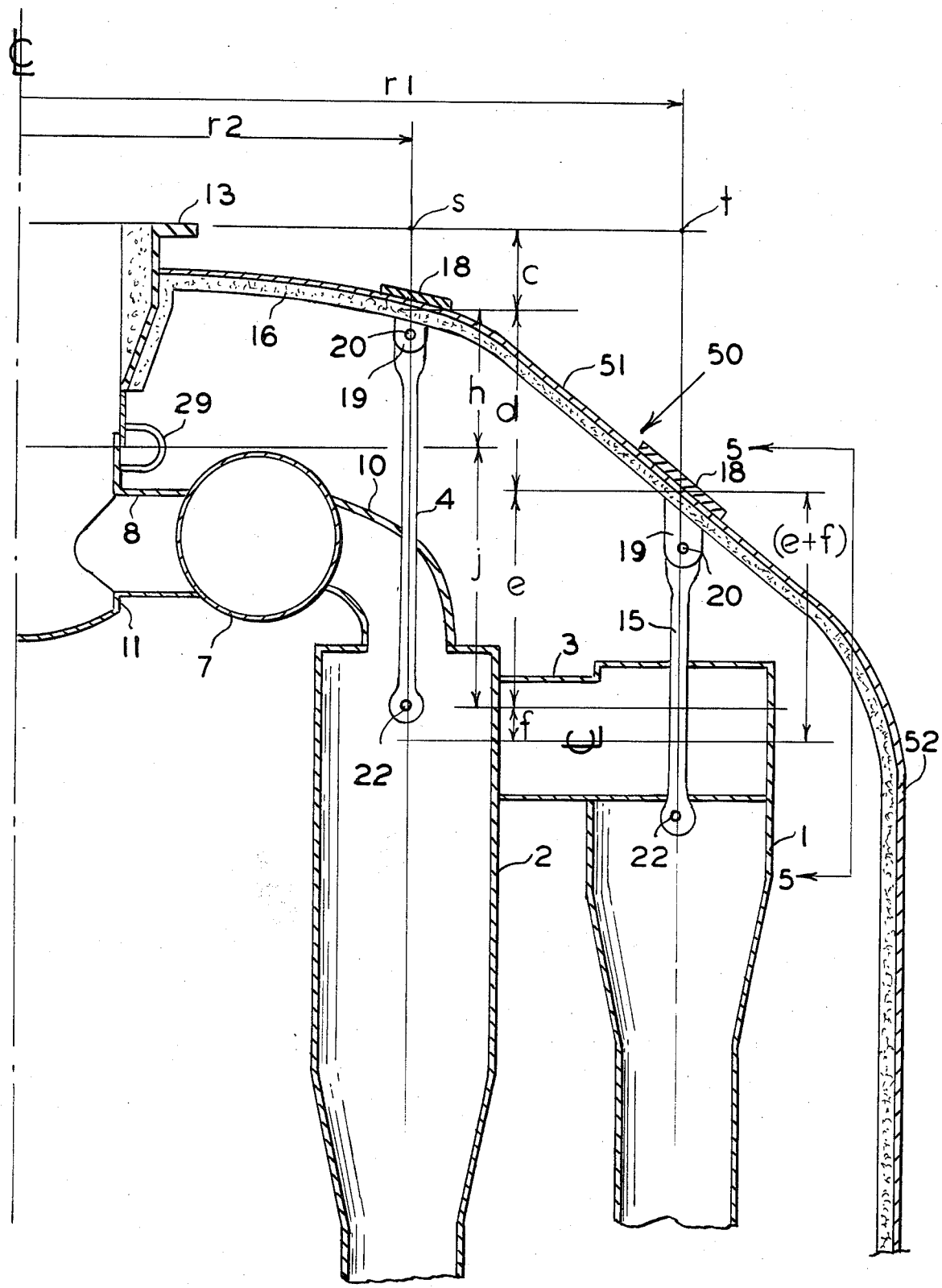
FIG. 1 is a partial view in vertical section of a reaction vessel applying the use of rod like support hangers to support cyclones in accordance with the present invention.
Figure 3:
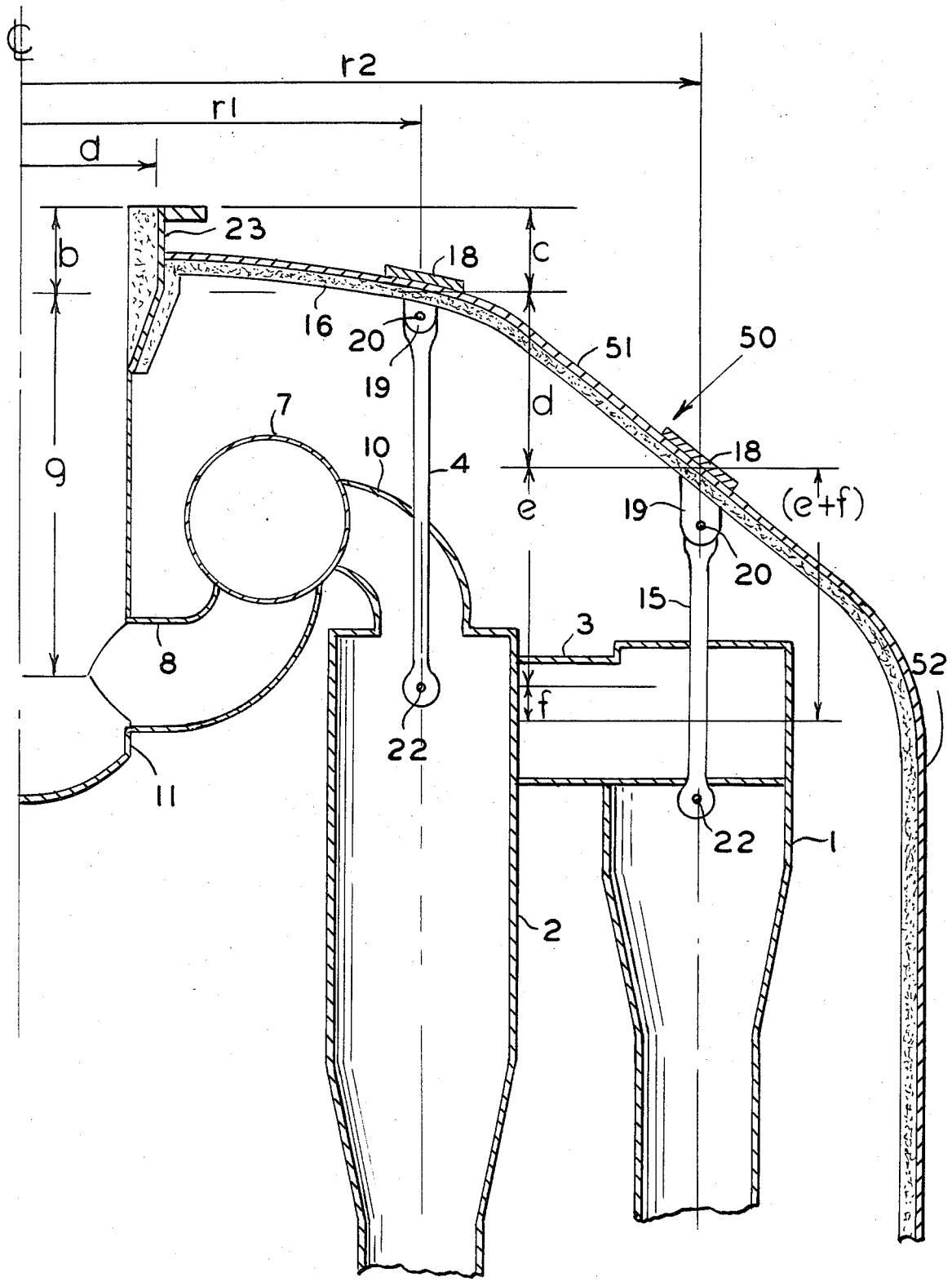

It is not necessary, of course, to use an expansion joint such as joint 29 of FIGS. 1 and 2. Use of an expansion joint may be eliminated if the differential vertical expansion at the centerline intersection of central riser 11 to connecting pipes 8 is minimized. Referring to FIG. 3, this is accomplished by constructing parts 9 and 11 with the same alloy used in rod 4 and adjusting the dimension g according to Equation 4.

$$g = [(c-b)\alpha cs(Tcs-Ta) + (d+e)\alpha ns(Tin-Ta)] / [\alpha ns(Tin-Ta)] \quad \text{Eq. 4}$$

For the thermal growth of the riser 11 to be substantially balanced with that of rods 4 and 15, the centerline of riser 11 should be at an elevation, g, as measured from the head of support rod 4. The dimension g can be determined by Equation 2.

$$\text{Eq. 2 } g = (cc-b)\cdot\alpha cs\cdot Tcs + (d+e)\cdot\alpha ns\cdot Tin)/(\alpha ns\cdot Tin)$$

where g, c, b, d and e are all shown in FIG. 3; $\alpha cs$, $Tcs$, $\alpha ns$, $Tin$, $Ta$, and $Tcs$ are as defined above in connection with Equation 3.

As is shown in FIG. 5, rods 4 and 15 are also canted at an angle of about 15° to 30° with respect to the vertical axis in the circumferential plane r2 and r1, respectively. This canting of the support rods 4 and 15 provides rotational stability of the cyclone-outlet assembly.

Regarding construction of any of the design alternatives discussed thus far, dimension a in the figures may be adjusted so that all internal parts except for cone 9 may be passed through nozzle 14. This includes collecting ring 7 if its segmented in at least 2 parts. Thus, the entire assemblage may be constructed of standard pipe segments which can be passed through the manway and require very little field welding. This is an advantage in economy of construction. It also provides for reduced maintenance needs where minimum downtime is important.

It should be noted in the foregoing figures that both pairs of rods holding a given cyclone are at the same radius. In other words, a pair of rods 4 is at a radius r, and a pair of rods 15 is at a radius r2. This assures that the thermal loadings will not affect the stress level in the rods and each rod will carry one-half of the weight load of the cyclone to which it is attached.

As shown in the figures, the secondary cyclones 2 are operably connected to riser 11 via a split collecting ring 7. It should be appreciated, of course, that under appropriate circumstances the secondary cyclone may be connected directly to the riser. Also, further stability can be provided by use of the standard dip leg bracing and optionally and preferably additional bracing may be used for the cyclone barrel (not shown) to reduce the radial thrust on the duct work due to pendulum type expansion at design temperature.

The present invention, of course, can be embodied in other specific forms without departing from the spirit and scope of the invention as defined by the appended claims.

What is claimed is:

1. A vessel having a non-horizontal roof and including:
   a plurality of primary cyclones each having a gas inlet and a gas outlet disposed within the vessel below said roof;
   a plurality of secondary cyclones equal in number to said primary cyclones, said secondary cyclones being disposed within the vessel below said roof, each of said secondary cyclones having a gas inlet and a gas outlet;
   means for operably connecting the gas outlet of a primary cyclone to a secondary cyclone;
   a pair of support rods for suspending each primary and each secondary cyclone from the roof of said vessel, the length of the support rods for said secondary cyclones being different than the length of the support rods for the primary cyclones and at least a part of the support rod for said secondary cyclones having a different thermal coefficient of expansion than said support rods for said primary cyclones such that under thermally induced expansion or contraction the elevation of operably connected cyclones relative to each other is substantially constant.

2. The vessel of claim 1 wherein said support rods for said secondary cyclones are supported from said vessel roof at points equidistant from the vertical axis of said vessel.

3. The vessel of claim 2 wherein said support rods for said primary cyclones are supported from said vessel roof at points equidistant from the vertical axis of the vessel, said points being at a greater distance than the point for said secondary cyclones.

4. The vessel of claim 3 including means for operably connecting the outlet of said secondary cyclones to a gas collection ring.

5. The vessel of claim 4 including means for operably connecting said gas collection means to a vertical riser.

6. The vessel of claim 5 wherein said riser has a length and thermal coefficient of expansion such that the thermal growth thereof is substantially equal to the thermal growth of said support rods.

7. The vessel of claim 1 wherein said support rods are pivotally mounted on said cyclones.

8. The vessel of claim 1 including a support member for pivotally suspending each support rod from said roof, said support member having a keeper plate, a web portion extending downwardly into said vessel and a horizontal pin for engaging a corresponding opening in the end of said support rod.

9. The vessel of claim 1 wherein said support rods are canted at an angle of from about 15° to about 30°.

10. In a vessel having a plurality of components located in said vessel below the roof thereof, some of which components are operably linked to each other and which under conditions of use are subjected to varying thermal conditions thereby giving rise to thermal stresses therebetween, the improvement comprising: suspending said components from said roof by support hangers having predetermined lengths and thermal coefficients of expansion such that the elevation of operably linked components relative to each other is substantially constant under thermally induced expansion or contraction whereby thermal stresses are minimized.

* * * * *